Patented Jan. 24, 1939

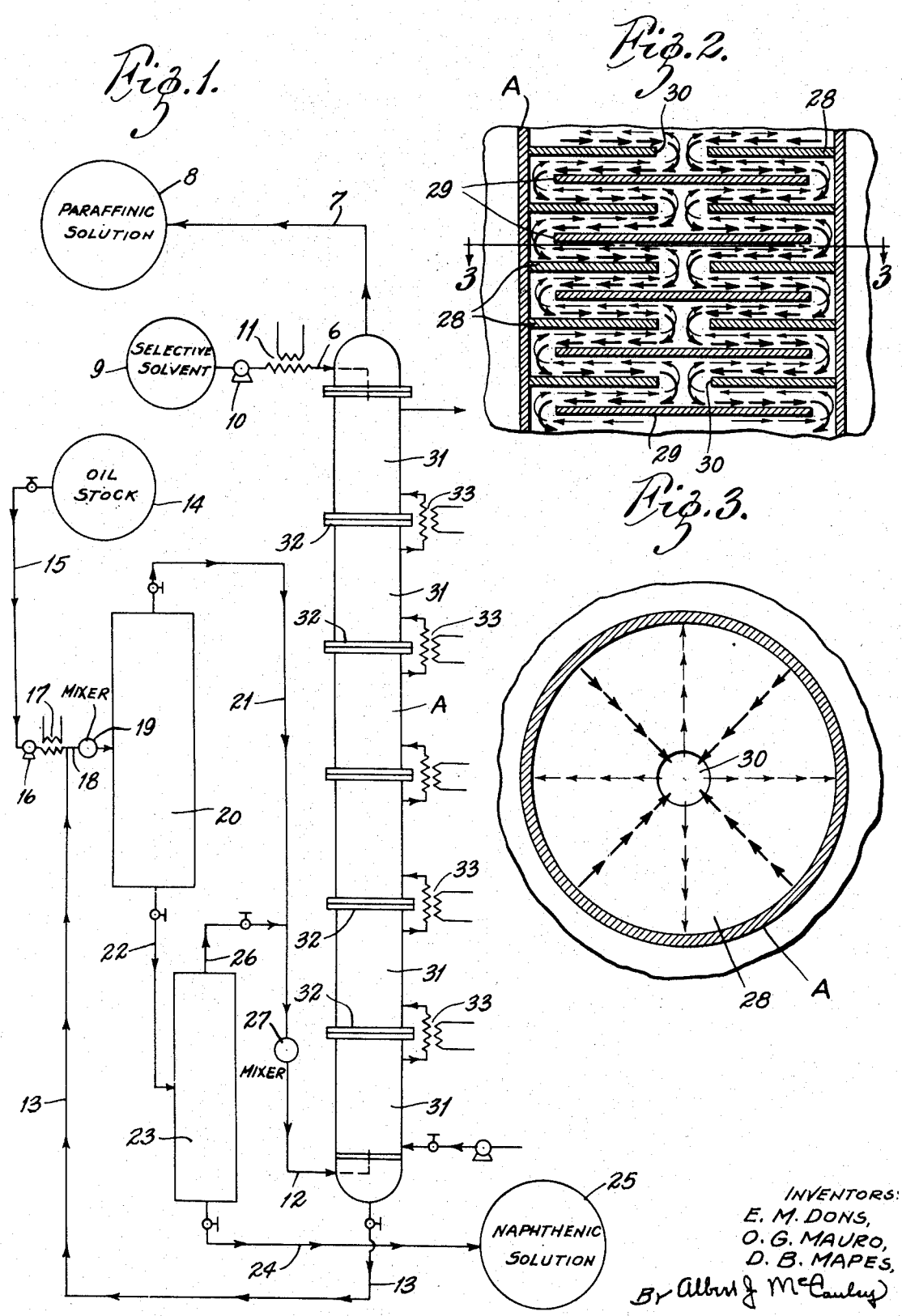

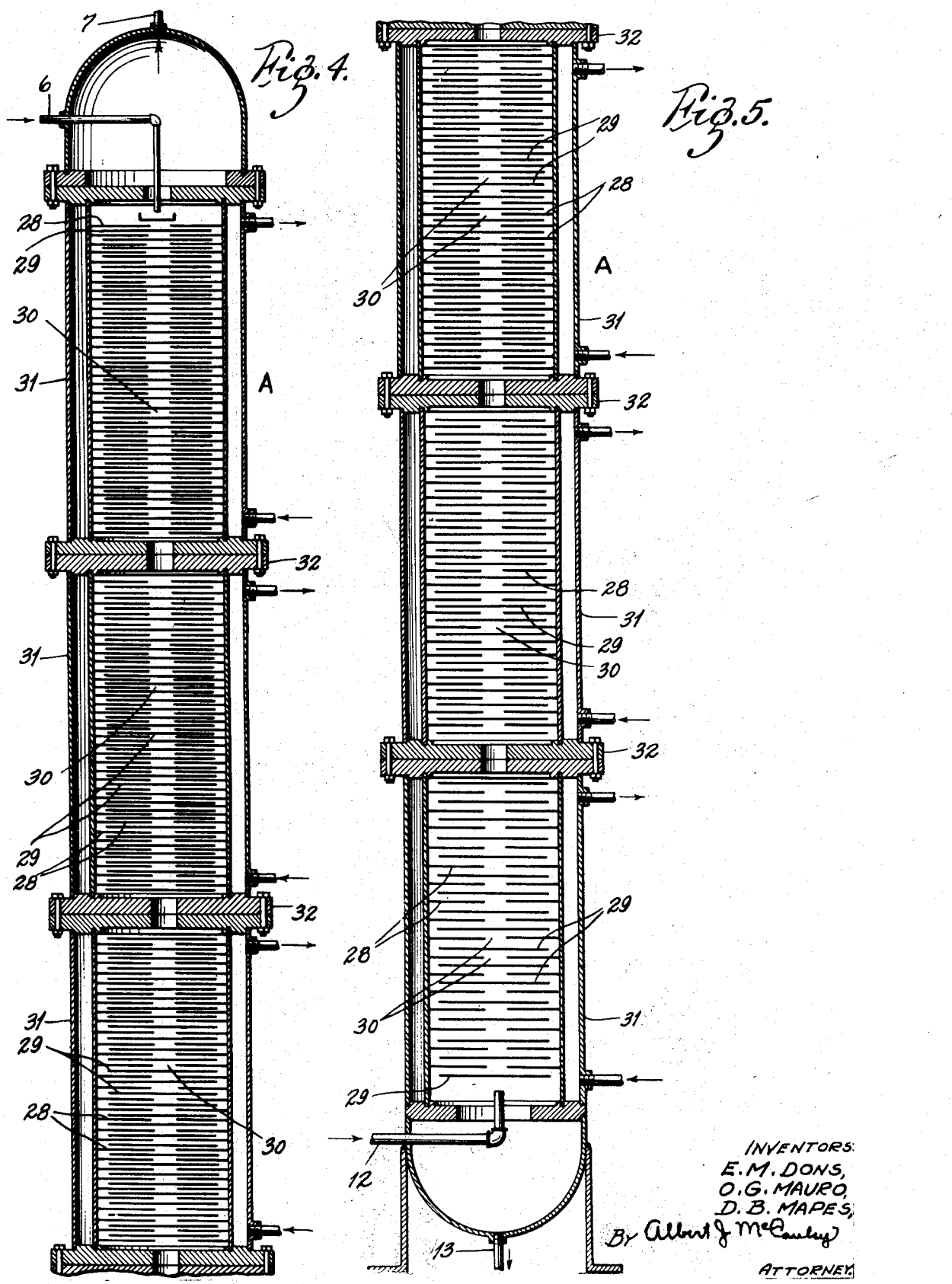

2,144,797

UNITED STATES PATENT OFFICE 2,144,797

METHOD OF AND APPARATUS FOR EXTRACTING CONSTITUENTS OF MINERAL OILS

Eddie M. Dons, Oswald G. Mauro, and Dwight B. Mapes, Tulsa, Okla., assignors to Mid-Continent Petroleum Corporation, Tulsa, Okla., a corporation of Delaware Application July 11, 1936, Serial No. 90,064

6 Claims. (Cl. 196—13)

This invention relates to methods of and apparatus for extracting constituents of mineral oils. The invention may be used with selective solvents for the separation of naphthenic and paraffinic constituents of mineral oils, especially in the manufacture of petroleum lubricating oils having high viscosity indexes.

An object of the invention is to very effectively separate the different constituents of the oils. To illustrate this feature we will hereafter describe a system wherein counterflowing solutions of the oil and solvent are divided into numerous relatively thin layers which flow radially in opposite directions, to provide a very large total area at the contacting faces of the different layers, thereby providing a high degree of efficiency in the transfer of selected constituents from each layer to the oppositely moving layer contacting therewith. In addition to forming the numerous relatively thin counterflowing layers, we have produced a condition wherein there is frequent mixing of the layers while they move in intersecting paths at relatively high speeds, followed by correspondingly frequent settling at lower speeds, all of which results in a very effective transfer of the selected constituents from one layer to another.

With the foregoing and other objects in view, the invention comprises the novel method, construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Fig. 1 is a diagrammatical view of a system embodying features of this invention.

Fig. 2 is a fragmentary section on a larger scale, with arrows diagrammatically indicating the paths of counterflowing solutions in the extracting column.

Fig. 3 is a horizontal section on the line 3—3 in Fig. 2, indicating the radial flow which results in a relatively high speed at a mixing zone near the center of the column, and lower speeds in a settling zone around said mixing zone.

Fig. 4 is a vertical section of the upper portion of the extracting column.

Fig. 5 is a similar view of the lower portion of said extracting column.

To illustrate one form of the invention we have shown an extracting chamber in the form of a tall column A, having an upper portion (Figures 1 and 4) provided with an inlet pipe 6 for a selective extracting solvent, and a discharge pipe 7 leading to a storage tank 8 for the paraffinic solution. The supply of fresh solvent is constantly discharged from a tank 9 (Fig. 1) to a pump 10 which forces the fresh solvent through a heat-exchanger 11 to the inlet pipe 6. The heat-exchanger 11 may be used to either heat or cool the incoming solvent, depending upon the operating conditions.

The lower portion of the extracting column A (Figures 1 and 5) is provided with an inlet pipe 12 for oil to be extracted, and a discharge pipe 13 for naphthenic solution which gradually settles to the bottom of the extracting column. Instead of immediately discharging this naphthenic solution from the system, it can be conveniently employed for an initial extraction of the incoming oil. For example, the oil stock to be treated may be constantly discharged from a tank 14 (Fig. 1), through a pipe 15 and pump 16 leading to a heat-exchanger 17 which discharges through a pipe 18 leading to a mixer 19 and thence to an initial extracting chamber, or settling chamber 20. The naphthenic solution from the bottom of the extracting column A may be conducted through pipe 13 to the pipe 18, where it enters into the constant stream of fresh oil passing to the mixer 19.

This mixture of fresh oil and degraded naphthenic solution is permitted to settle and separate in the initial extracting chamber 20, where the relatively paraffinic oil solution to be hereafter mentioned, is constantly discharged at the top through a pipe 21, while the naphthenic solution is constantly discharged at the bottom through a pipe 22. As a further step to recover valuable paraffinic material from the naphthenic solution discharged through pipe 22, said pipe may be connected to an intermediate extracting chamber 23 where the degraded naphthenic solution is constantly discharged at the bottom and conducted through pipe 24 to a storage tank 25.

The paraffinic solution rising to the top of the intermediate extracting chamber 23 is discharged through a pipe 26 to the pipe 21 where it merges into the stream of solution from the initial extracting chamber 20. The resultant solution comprising portions of the solvent united with oil stock that has been subjected to preliminary extractions, is transmitted through a mixer 27 to the inlet pipe 12 leading into the lower portion of the extracting column A.

The naphthenic solution discharged through pipe 13 at the bottom of the extracting column A, can be thus utilized for preliminary extractions of the incoming oil before it reaches the inlet pipe 12 of the main extracting column A, one of the objects being to use this naphthenic solution for relatively simple preliminary extractions, in advance of the more difficult subsequent extracting operations to be performed in the column A.

The oil solution entering through pipe 12 at the lower portion of the column A (Figures 1 and 5) merges into the heavy naphthenic solution at this point. The light paraffinic constituents gradually rise through this column until they are eventually discharged at the top through the pipe 7 leading to the tank 8 for storage of the paraffinic solution. Heavy naphthenic constituents are gradually extracted and eventually flow to the bottom of the column, where they are discharged through the pipe 13.

Attention is now directed to the interior of the extracting column A where the light and heavy solutions are divided into numerous relatively thin layers which flow in opposite directions, as suggested in Figures 2 and 3. This column is provided with alternating baffle plates 28 and 29. Each baffle 29 has a peripheral edge separated from the inner face of the column. Each baffle 28 has a peripheral edge suitably united with the inner face of the column, and an approximately central opening 30 through which the different solutions rise and fall in passing from one of the baffle plates to another.

By referring to Figures 2, 3 and 4 it will be understood that the solutions of oil and solvent are divided into numerous thin layers of different specific gravities contacting with each other. These contacting layers move radially in opposite directions, and at gradually changing speeds, toward and away from the central portion of the column. The highest speed is attained near the central portion of the column where all of the liquid must pass through a relatively small opening 30, while the lowest speed is near the periphery where approximately the same volume of liquid flows through a much larger opening between the periphery of a baffle plate 29 and the inner face of the column.

Mixing zones are formed at the central openings 30 where the oppositely moving layers travel in intersecting paths from one plane to another at a relatively high speed. The resultant mixtures are permitted to settle and stratify at lower speeds around the central mixing zone, the speed of each layer being gradually increased as it moves toward the central mixing zone and gradually decreased as it moves away from said mixing zone. The oppositely moving layers also travel through intersecting paths in the zones of lowest speed around the peripheries of the baffle plates 29, so as to provide secondary mixing zones alternating with the primary mixing zones at the central portion of the column.

The fresh solvent which enters at the upper portion of the column is thus combined with oil that enters at the lower portion of the column to provide numerous relatively thin layers distributed throughout the column in such manner that the natural counterflow is frequently interrupted by mixing at relatively high speeds and settling at lower speeds. The surface contact is very greatly increased, and the selective action of the solvent is effectively obtained in merely transferring constituents of one thin layer to another thin layer. Furthermore, the agitation at the central mixing zones is not violent enough to form an objectionable emulsion, but sufficient to cause intimate blending of the two phases which freely separate in the numerous low speed settling zones.

Another advantage of providing smooth, flat settling zones lies in the fact that they do not provide obstructions for solid or semi-solid matters, such as waxes, asphalt and sludges which might otherwise collect and interfere with the flow of finely divided streams.

The radial flow from a high speed zone near the center of the column to a zone of lowest speed at the periphery of the column has a further advantage in heating or cooling all of the numerous streams in the low speed zones at the periphery. The heat transfer is most effective at the periphery of the column where there is a large area of surface contact between substantially all of the constituents of the different solutions and the inner face of the column. A jacket surrounding this column could be most effectively utilized to heat or cool the streams of liquid in the column.

The column herein shown is composed of six sections (Figures 1, 4 and 5), each section being surrounded by a jacket 31 which lies between flanges 32 at the top and bottom of the section. To provide for the transfer of any desired heating or cooling fluid from one jacket to another, said jackets are connected by means of heat-exchangers 33 (Fig. 1). The heating or cooling fluid may flow in the directions indicated by arrows in Figures 1, 4 and 5, or the flow may be reversed, depending upon the temperatures desired in the column, and the temperature of the incoming fluid. For example, if a cool fluid is introduced near the bottom to provide successive increases in temperature toward the top, the heat-exchangers 33 are employed to gradually increase the temperature of the cool fluid. This will progressively increase the temperature of the internal layers as they pass from the naphthenic phases in the lower portion of the column to the paraffinic phases in the upper portion of said column, and the heat transfer will occur around the periphery of the tower where all of the constituents are well distributed in passing from one mixing zone to another. More specifically stated, the temperature at the top of the column may be 80° to 130° F., while the bottom of the column is at a temperature of 10° F. to 30° F. lower than the top.

A further advantage can be gained by so arranging the baffle plates 28 and 29 that the distance between said plates is progressively decreased toward the upper portion of the column. This is shown in Figures 4 and 5. It progressively decreases the thickness of the layers as they pass from relatively naphthenic phases in the lower portion of the column to more paraffinic phases in the upper portion of said column. This variation in the thicknesses of the different layers results in a more effective selective action of the solutions at the several elevations where the conditions as to ratios of solvent and paraffinic and naphthenic constituents are undergoing constant changes. For example, in a desirable form of the invention, most of the selective solvent passes out with naphthenic compounds at the bottom of the column, and a very effective selective action can be obtained by producing relatively thin layers at the top, where the fresh solvent enters into more valuable portions of the mixture, to be discharged as the paraffinic solution, containing a very small percentage of the solvent. The paraffinic solution discharged at the top may be 70 parts, compared with 130 parts in the naphthenic solution discharged at the bottom, but this will depend upon the operating conditions including the composition of the incoming oil, the quantity and nature of the solvent, and the results desired.

As a specific example of results obtained in using the extracting column alone, without the advantages of preliminary or subsequent extractions, we treated a petroleum lubricating oil stock having an A. P. I. gravity of 25.8°, a Saybolt Universal viscosity of 251 at 100° F. and 48.2 at 210° F. The selective solvent was beta beta prime dichlorethyl ether, and we used 1.8 parts of this solvent to 1 part of the original oil. The resultant paraffinic oil, after the solvent was distilled therefrom, had an A. P. I. gravity of 29.9°, and a viscosity index of 102.6. The yield of this valuable oil amounted to about 74.7% of the original oil.

It is to be understood that any suitable selective solvent can be employed to separate paraffinic and naphthenic constituents of oil stocks, and that the temperatures and proportions of the oil and solvent may be varied as desired. Examples of such solvents are dischlorethyl ether, cresylic acid, furfural, and nitrobenzene. It will also be understood that the solvents can be recovered from the paraffinic and naphthenic solutions by distillation, or in any other suitable manner.

We claim:

1. In the art of using selective solvents to separate paraffinic and naphthenic constituents of mineral oils, the method which comprises transmitting mineral oil and the selective solvent into a separating chamber, dividing the resultant solutions into numerous thin layers of different specific gravities contacting with each other, causing said layers to move radially in opposite directions toward and away from the central portion of said chamber, and at gradually changing speeds, the highest speed being near said central portion and the lowest being near the periphery of said chamber, causing said oppositely moving layers to advance in intersecting paths while flowing from one plane to another at the central zones of relatively high speed, thereby mixing constituents of the different layers, as they advance at said relatively high speed, permitting the mixtures to settle and stratify at lower speeds around the central mixing zone, causing the oppositely moving layers to progress through the numerous mixing and settling zones, and separately discharging the light and heavy liquids from said chamber.

2. In the art of using selective solvents to separate paraffinic and naphthenic constituents of mineral oils, the method which comprises transmitting mineral oil and the selective solvent into a separating chamber, dividing the resultant solutions into layers of different specific gravities contacting with each other, causing said layers to move radially in opposite directions and at gradually changing speeds toward and away from the central portion of said chamber, the highest speed being near said central portion and the lowest being near the periphery of said chamber, causing said oppositely moving layers to advance in intersecting paths while flowing from one plane to another at the central zones of relatively high speed, thereby mixing constituents of the different layers as they advance at said relatively high speed, permitting the mixtures to settle and stratify at lower speeds around the central mixing zone, the speed of each layer being gradually increased as it moves toward the central mixing zone and gradually decreased as it moves away from said mixing zone, causing the oppositely moving layers to progress through the mixing and settling zones, and separately discharging the paraffinic and naphthenic solutions from said chamber.

3. In the art of using selective solvents to separate paraffinic and naphthenic constituents of lubricating oils, the method which comprises transmitting the lubricating oil stock and the selective solvent into an upright separating column, dividing the resultant solutions into numerous thin, approximately horizontal layers of different specific gravities contacting with each other, causing said approximately horizontal layers to move radially in opposite directions and at gradually changing speeds toward and away from the central portion of said column, the highest speed being near said central portion and the lowest being near the periphery of said column, causing said oppositely moving layers to flow in intersecting paths from one plane to another at the central zones of relatively high speed, thereby mixing constituents of the different layers, permitting the mixtures to settle and stratify at lower speeds in approximately horizontal planes around the central mixing zone, the speed of each layer being gradually increased as it moves toward the central mixing zone and gradually decreased as it moves away from said mixing zone, causing the oppositely moving layers to progress through the numerous mixing and settling zones, and separately discharging the paraffinic and naphthenic solutions from said column.

4. In the art of using selective solvents to separate paraffinic and naphthenic constituents of mineral oils, the method which comprises transmitting mineral oil and the selective solvent into an upright separating column, dividing the resultant solutions into approximately horizontal layers of different specific gravities contacting with each other, causing said approximately horizontal layers to move radially in opposite directions toward and away from the central portion of said column, and at gradually changing speeds, the highest speed being near said central portion and the lowest being near the periphery of said column, causing said oppositely moving layers to advance in intersecting paths while flowing from one plane to another at the central zones of relatively high speed, thereby mixing constituents of the different layers, permitting the mixtures to settle and stratify at lower speeds around the central mixing zone, causing the oppositely moving layers to progress through the several mixing and settling zones, progressively decreasing the thickness of said layers as they pass from relatively naphthenic phases in the lower portion of said column to more paraffinic phases in the upper portion of said column, and separately discharging the paraffinic and naphthenic solutions from said column.

5. In the art of using selective solvents to separate paraffinic and naphthenic constituents of mineral oils, the method which comprises transmitting mineral oil and the selective solvent into an upright separating chamber, dividing the resultant solutions into numerous thin, approximately horizontal layers of different specific gravities contacting with each other, causing said layers to move radially in opposite directions toward and away from the central portion of said chamber, and at gradually changing speeds, the highest speed being near said central portion and the lowest being near the periphery of said chamber, causing said oppositely moving layers to advance in intersecting paths while flowing from one plane to another at the central zones of relatively high speed, thereby mixing constituents of the different layers, permitting the mixtures to settle and stratify at lower speeds around the central mixing zone, causing the oppositely moving layers to progress through the numerous mixing and settling zones, progressively increasing the temperature of said layers as they pass from the naphthenic phases in the lower portion of said chamber to the paraffinic phases in the upper portion of said chamber, and separately discharging the paraffinic and naphthenic solutions from said chamber.

6. In an apparatus for separating paraffinic and naphthenic constituents of mineral oils, an extracting column having an upper portion provided with an inlet for an extracting solvent and an outlet for paraffinic solution, a lower portion of said column being provided with an inlet for oil to be extracted and an outlet for naphthenic solution, and a series of baffles in said column, said baffles comprising plates having peripheral edges separated from the inner face of the column alternating with plates having peripheral portions united with the inner face of the column, the last mentioned plates being provided with approximately central openings through which the different solutions rise and fall in passing from one of said plates to another, the distance between said alternating plates being progressively decreased toward the upper portion of the column.

EDDIE M. DONS.
OSWALD G. MAURO.
DWIGHT B. MAPES.